3,345,391
ORGANO METAL COMPOUNDS OF POLYAMINO POLYACETIC ACIDS
Horst G. Langer, Wayland, Mass., assignor to The Dow Chemical Company, Midland, Mich., a corporation of Delaware
No Drawing. Filed Sept. 20, 1966, Ser. No. 580,609
7 Claims. (Cl. 260—429.7)

ABSTRACT OF THE DISCLOSURE

Organometallic compounds formed by the reaction of a mono-valent organometallic radical with a polyamino polycarboxylic acid chelating agent.

This application is a continuation-in-part of my application Ser. No. 84,772, filed Jan. 25, 1961 and now abandoned.

This invention relates to a new class of chemical compounds characterized as being partially or fully substituted organo metal salts of ethylene dinitrilo tetraacetic acid and similar polyamino polycarboxylic acids.

For many purposes it is essential to have certain metals in organic form wherein the metal can be made available for its biological activity. For example for many purposes metal chelates are useful biologically in that the metal provides a reservoir of that metal ion for the physiological system into which it is passed, or if carried as a chelate it can be exchanged for another metal in the system and thus be useful, for example, in detoxification operations. In this connection reference may be had to United States Patent 2,698,823, Bersworth and Rubin. Quite often it is desirable that the metal added to a biological system also carry additional organo groups which can contribute to its usefulness without impairing biological activity or possibly while enhancing the biological activity of the compound.

It is, accordingly, a fundamental object of this invention to provide organo tin compounds characterized by their being salts of certain amino acids which will also carry other organo groups rendering the compounds useful in organic systems.

It is another object of the invention to provide tetra substituted organo tin compounds carrying four functional groups any one of which may be modified to alter the properties of the tin compounds.

Other objects and advantages of the invention will in part be obvious and in part appear hereinafter.

This invention accordingly is embodied in a new kind of chemical compound which is a novel salt of fully substituted organo metal and may be characterized essentially as a salt of organo substituted metal formed with a chelating agent. More specifically the structure of the composition may be shown in conventional fashion by the following representation:

$$A_{4-m}X(Me(R)_n)_m$$

wherein the R represents the organo substituents on the metal; and
A=H, Na, K, ½ Ca, Mg and salt-forming metals, etc.;
Me represents the metal, for example tin; and
X represents the chelating moiety of the molecule;
n is an integer which has a value needed to satisfy the valence of the metal;
m is an integer indicating the number of organo metal groups reacted with the chelating agent. More specifically these compounds may take the form of bis trivinyl tin salt of ethylene dinitrilo tetraacetic acid, which is represented by the following formula:

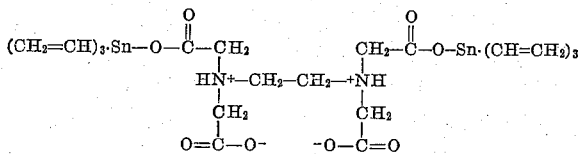

From the example it will be seen that the organo substitution of the tin, which is in the salt-forming portion of molecule, may be an unsaturated group, such as a vinyl group or an allyl group or further that the organo group on the tin atom may be a phenyl group, cyclohexyl group, or it may be any other more or less reactive group.

With a molecule of this structure it will be seen that functionality appears in several places and that it can take the form of unsaturation suitable for reaction with polymer forming materials, or for direct polymerization, and further the molecule can be used as the carrier of other groups.

The structure of the compound leads to a number of advantages in that the points of variability introduce the possibility of making the compound very specific biologically, or very broadly active as an insecticide, bactericide, herbicide or parasiticide. The compound offers so many sites for the inclusion of chemical moieties and combinations of moieties that "tailor made" specific insecticides become possible.

Typical compounds which can be made in accordance with this invention are the following:

(1) Bis-trivinyltin ethylenediaminetetraacetate
(2) Bis-triphenyltin EDTA
(3) Tetrakis-trivinyltin EDTA
(4) Tetrakis-triphenyltin EDTA
(5) Bis-triallyltin EDTA
(6) Tetrakis-triallyltin EDTA
(7) Tetrakis-tricyclohexyltin EDTA The organo metal portion of the compound is best exemplified by organo tin salts which are readily available commercially as hydroxides, halides, acetates or bis organo oxides having at least the following in the structure:

In these compounds the R groups may be all alike or different. The remaining moiety of the tin compound, i.e., the hydroxyl, halide, acetate, etc. is at the point of reaction with the chelating acid.

Reference to the following specific examples will give an accurate indication of the manipulations involved in the formation of each compound.

Example 1.—Bis-(trivinyltin) ethylenedinitrilo tetraacetate 0.01 mole of $H_4 \cdot EDTA$ is dissolved in 250 milliliters water. 0.02 mole of $(CH_2=CH)_3 \cdot SNOH$ is added with constant stirring. A white precipitate is formed, which is filtered after 1 hour, washed with very little acetone or alcohol and dried by suction.

*Example II.—Bis-triphenyltin ethylenediaminetetraacetate*

Following the procedure of Example I, triphenyltin hydroxide in proportions corresponding to those specified for the tin compound of Example I is reacted with EDTA to form bis-triphenyltin ethylenedinitrilo tetraacetate.

*Example III.—Bis-triphenyltin ethylenediaminetetraacetate*

Triphenyltin acetate is reacted with disoduim salt of ethylenedinitrilo tetraacetic acid in accordance with Example I to form bis-triphenyltin ethylenedinitrilo tetraacetate.

*Example IV.—Tetrakis triphenyltin EDTA*

Reaction.—$4\phi_3SnOH + EDTA \rightarrow [\phi_3Sn]_4EDTA + 4H_2O$ [1]

[1] $\theta$=phenyl=$C_6H_5$.

*Quantities.*—0.52228 gram=1.423 mole $\phi_3SnOH$: M.W. 367.01. 0.10398 gram=0.3558 mole EDTA: M.W. 292.246.

*Procedure.*—$\phi_3SnOH$ is dissolved in about 30 milliliters hot ethyl alcohol. EDTA is dissolved in 250 milliliters boiling $H_2O$. 150 milliliters ethyl alcohol was added to $\phi_3SnOH$-alcohol solution before adding hot EDTA solution to previous solution. A clear solution was obtained. Reaction was kept stirring and temperature remained just below boiling point for about 24 hours. Residue was formed which increased by evaporating EtOH. The residue was filtered off.

Yield: 0.594375 gram=98.95%. M.P. 133° uncorrected.

*Analysis.*—Found: C=50.1, C=57.1; H=4.7, H=5.0; N=1.6; Sn=27.43. Calculated: C=58.3; H=4.3; N=1.66; Sn=28.12.

*Example V.—Triallyltin EDTA*

Reaction.—$4(C_3H_5)_3SnOH + EDTA \rightarrow$
$[(C_3H_5)_3Sn]_nH_{4-n}EDTA + nH_2O$

*Quantities.*—0.547955 g.=2.1163 mole $(C_3H_5)_3SnOH$: molecular weight 258.92. 0.154630 gram=0.5291 mole EDTA: molecular weight 292.241.

*Procedure.*—Both compounds were slurried in about 300 milliliters water+ethyl alcohol (1:1). Reaction was kept just below the boiling point. After 2 days about 300 milliliters ethyl alcohol was added and the reaction was kept hot and stirred. The insoluble part was filtered off (=0.14752 gram). Ethyl alcohol was distilled from the filtrate under reduced pressure; the temperature did not exceed 35° C. A very small amount of residue was formed in the remaining water. Evaporation of water until dryness produced the product which was washed with $CH_2Cl_2$.

*Total yield.*—0.3226 gram of mixed triallyltin EDTA compounds as identified by infra-red analysis.

*Analysis.*—Found: C=34.8; H=5.6; N=2.6; Sn=31.8. M.P. material starts to turn yellowish at 205° C.

*Example VI.—Tetrakis tricyclohexyltin EDTA;*
$C_{82}H_{144}N_2O_8Sn_4$

Molecular Wt. 1760.87

Tricyclohexyltin hydroxide (20 millimoles) and EDTA acid (5 millimoles) are suspended in approximately 250 milliliters of benzene. The suspension is refluxed for approximately 3–4 hours allowing the distilled water to be trapped before the benzene is recycled. When all of the EDTA has been dissolved and no more water distills, the reaction is complete and the product can be obtained by stripping the solvent and recrystallizing the crude material. Recrystallization from ligroin yields approximately 85% product, melting at 188–195° C.

*Analysis.*—Calc. for C, 55.9; H, 8.2; N, 1.6; Tin, 27.0. Found: C, 55.3; H, 8.5; N, 1.5; Tin, 25.1.

*Example VII.—Tetrakis trivinyltin EDTA;*
$C_{34}H_{48}N_2O_8Sn_4$

Molecular Wt. 1087.57

1 millimole of EDTA acid and 4 millimoles of trivinyltin hydroxide were dissolved in approximately 200 milliliters of water with stirring and heating to about 90° C. Since addition of an equal volume of methanol did not precipitate the product, the solvent was evaporated at reduced pressure and room temperature until the solid product separated.

The product was not recrystallized and it melted with decomposition at 295° C.

*Analysis.*—Calc.: C, 37.6; H, 4.5; N, 2.6; Tin, 43.7. Found: C, 37.6; H, 2.7; N, 2.7; Tin, 43.2.

To make the mixed salts it is necessary only to regulate the mole proportions of the EDTA reactant to the organo compound. Thus, following the procedures of any of the examples it is possible to introduce one mole of trivinyltin and follow it with one, two or three moles of triphenyltin. Other combinations of organo tins are evident. The organo tin reacts with any available free acid group to complete substitution of the EDTA molecule.

In this fashion the formulation of the desired salt is carried out; by selection of the metal, carrying the desired organo substituents, virtually any combination of organo moiety-metal may be had. While the examples are in terms of tin salts, it is to be understood that lead and germanium will give parallel reactions and products.

Referring back to the general formula and the specific formulas for the trivinyltin salts given above it is, of course, evident from the structure that the raw materials necessary for the formation are, at least, the essential chelating agent, which in this instance was ethylenediaminetetraacetic acid and triorganometal compound. Specifically, to form the trivinyltin salt portion of a molecule it is most advantageous to have as raw materials the corresponding tin hydroxide, or acetate or halide. Thus tin hydroxide, with the tin in the tetravalent form, the remaining three valences of the tin being satisfied by whatever organo group is to be carried by the compound, is the basic material used to react with ethylenediaminetetraacetic acid. When this compound is reacted in an appropriate stoichiometric amount, namely, two moles of tin for each mole of ethylenediaminetetraacetic acid, monofunctional tin is attached to two acid groups of the ethylenediaminetetraacetic acid. To have it carry more or less than two tin atoms, it is reacted initially with one tri-organotin hydroxide to a maximum extent of four moles per mole of ethylenediaminetetraacetic acid.

If the di-tin salt of EDTA is reduced with diphenyltin dichloride, hydrogen chloride is removed from the sphere of the reaction and the bis trivinyltin salt of diphenyltin ethylenediaminetetraacetic acid chelate is formed. If it is desired to have other groups than the phenyl groups attached in this reaction the corresponding organotin halide is used as a starting material for the salt and the chelate portion of the compound. This sequence of compounds is described in my copending application filed contemporaneously herewith, now issued in U.S. Patent 3,117,147, Jan. 7, 1964.

Thus the organo groups attached to the tin atoms in the compound, as described generally herein, may be any unsaturated, cycloalkyl, or aryl organic groups even where those groups carry certain common substituents such as halogens, and are substituted with a hydroxyl or ether group. Similarly where I have used tin as illustrating the reactions specifically, any metal having the corresponding level of reactivity with organic moieties is useful for the purposes. For example, the other metals of Groups 4A, 5A, 2b of periodic classification of elements may be used, namely, lead, germanium, arsenic, antimony and mercury (in at least its divalent form), etc.

Since it is reaction of these materials with a chelating agent which is described, it is apparent that the chelating portion of the reactant mixture may be an ethylenediaminetetraacetic acid as the type compound but it is also clear that the chelating agent may have a formula corresponding to the following:

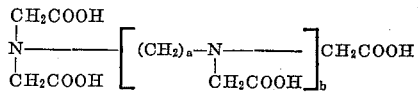

wherein $a$ represents an integer having a value of 2, 3 or 4, and $b$ represents an integer having a value of 0, 1, 2, 3 or 4.

Typical chelating agents useful in the formation of this type compound are:

(1) Ethylene diamine tetraaectic acid
(2) β-Hydroxyethyl ethylene diamine triacetic acid
(3) Di ethylene triamine pentaacetic acid
(4) Tri ethylene tetraamine hexaacetic acid (the β-hydroxyethyl variants of 3 and 4 when the β-hydroxyl group replaces an acid moiety or two)
(5) Nitrilotriacetic acid These acids may all be used as the chelating acid in any of the reactions or syntheses reported in Examples I–VII herein. In compounds of this general class the alkyl group between the nitrogen atoms may be a 2-, 3-, or 4-carbon group or the number of nitrogens and groups may be increased so that the compound can become a polyamine polyacetic acid.

Inasmuch as the materials used are inherently reactive, temperature at which the reaction is carried out may be in the range which will keep the materials in the liquid phase, i.e. solution. Since the reaction is carried out in water, temperatures from approximately ambient to approaching 100° C. are suitable; as is true of most reactions of this character elevated temperatures cause the reaction to go more quickly.

The compounds formed in accordance with the invention are colorless crystalline solid, non-hygroscopic compounds which may be reduced to fine degrees of subdivision and have considerable value as fungicides, slimicides, bactericides and insecticides. Testing of bis trivinyltin EDTA indicates complete activity against the Southern army worm in concentrations of 50 parts per million and two-spotted spidermites in concentrations of 500 parts per million. It is also effective as a herbicide, fungicide and insecticide in general.

The compound kills internal parasites in the digestive tracts of warm blooded animals; it is insecticidal against coleptera, against lepidoptera in the larval and imago phase, it has acaricidal properties; it is an effective agent for killing the larval and imago phases of various diptera as well as certain perdatory orthoptera; it is an eeffctive agent in the control of trash fish in near-stagnant waters and for the control of Daphnia; it has strong fungicidal activities in the control of both plant pathogenic parasites and spoilage molds; it is active as an agent in the control of various bacterium-caused plant diseases such as fire blight, and controls also various soil borne microorganisms; it is active in the control of *Salmonella pullorum*; is useful in the control of *Staphylococcus aureus, Candida albicans,* and in particular, the dermal parasite *Trichophyton mentagrophytes*. It can be applied to terrestrial plants in herbicidal rates but these are rates distinctly higher than those at which it controls parasites including insects and plant diseases. In contrast, in water, it is a relatively active agent in the control of water weeds.

To make use of the compound, to obtain the benefits of the useful properties hereinbefore mentioned, the compound is employed in unmodified form or is dispersed in water with the aid of a cosolvent with or without surface active agent. Also, the compound is ball milled or otherwise finely and intimately subdivided with a finely divided carrier such as an attapulgus clay, infusorial earth, wood flour, and the like. In such form the compound is applied to the locus at which it is desired to exhibit its useful properties. Thus in the control of insects it can be brought into contact with surfaces traversed by the insect, foods eaten by the insect, or the insect itself; for the control of fungi, it can be brought into contact with a locus susceptible of fungus attack prior to infestation; also, it can be dispersed in water whereby to act as an herbicide for the control of aquatic vegetation.

What is claimed is:

1. A new compound having a formula corresponding to the following representation:

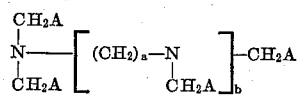

wherein A is selected from the group consisting of —COOH, —CH$_2$OH and —COOMe(R)$_3$, not more than two A being —CH$_2$OH, and at least one of said indicated A positions being —COOMe(R)$_3$, with R selected from the group consisting of vinyl, allyl, phenyl and cycloalkyl groups; $a$ having a value selected from the group consisting of 2, 3, 4; $b$ having a value selected from the group consisting of 0, 1, 2, 3, 4; Me being selected from the group consisting of tin, lead and germanium.

2. As a new compound, the bis trivinyltin ethylenediaminetetraacetate.

3. As a new compound, the bis triphenyltin ethylenediaminetetraacetate.

4. As a new compound, tetrakis triphenyltin ethylenediaminetetraacetate.

5. As a new compound, triallyltin ethylenediaminetetraacetate.

6. As a new compound, tetrakis tricyclohexyltin ethylenediaminetetraacetate.

7. As a new compound, tetrakis trivinyltin ethylenediaminetetraacetate.

References Cited

UNITED STATES PATENTS 3,120,550    2/1964    Langer _____ 260—429.7

TOBIAS E. LEVOW, *Primary Examiner.*

W. F. W. BELLAMY, *Assistant Examiner.*